Oct. 30, 1956   A. W. PEARCE   2,768,450
CHAIN GAUGE FOR A CHAIN SAW
Original Filed April 3, 1947   2 Sheets-Sheet 1
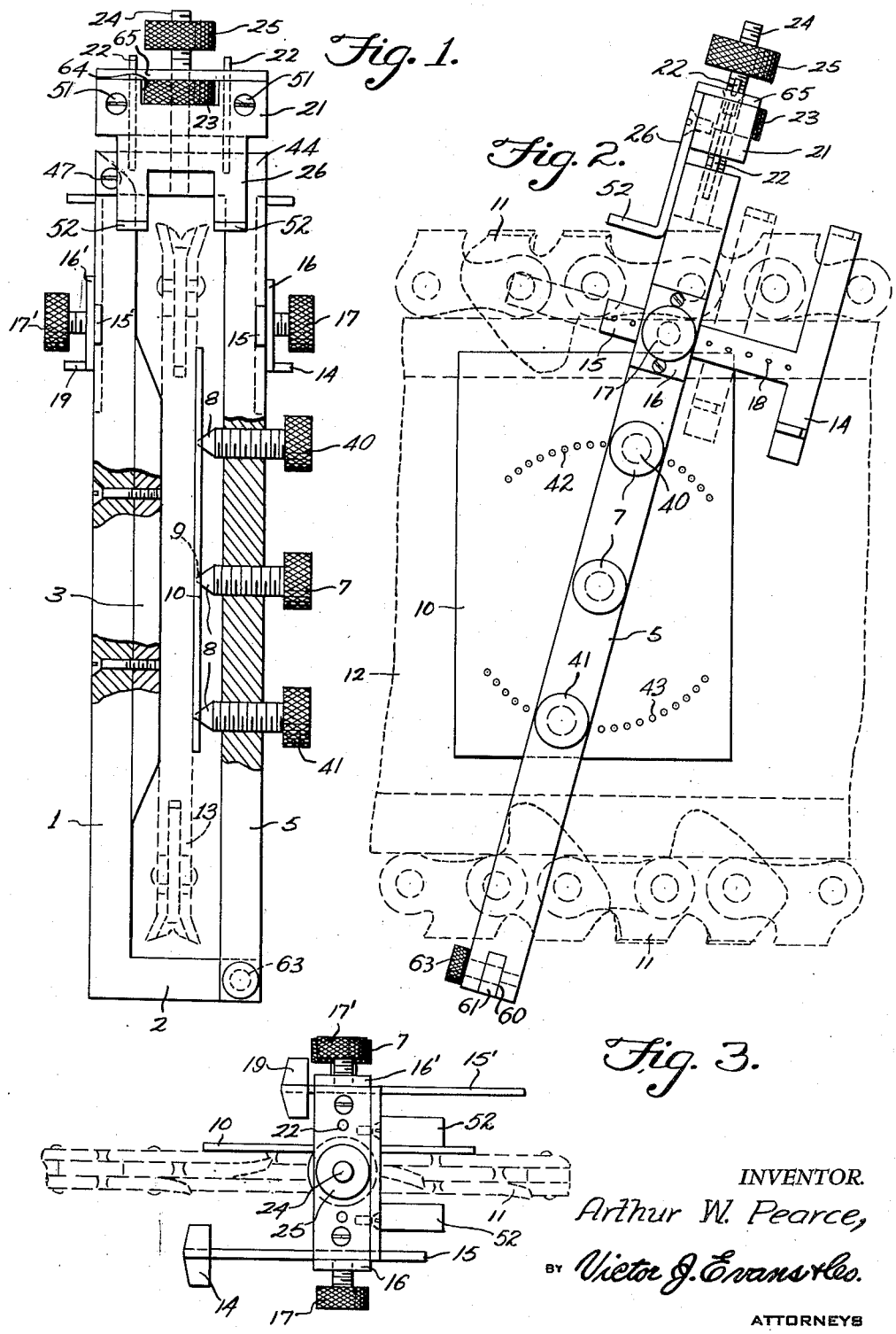
INVENTOR.
Arthur W. Pearce,
BY Victor J. Evans & Co.
ATTORNEYS Oct. 30, 1956  A. W. PEARCE  2,768,450
CHAIN GAUGE FOR A CHAIN SAW
Original Filed April 3, 1947  2 Sheets-Sheet 2
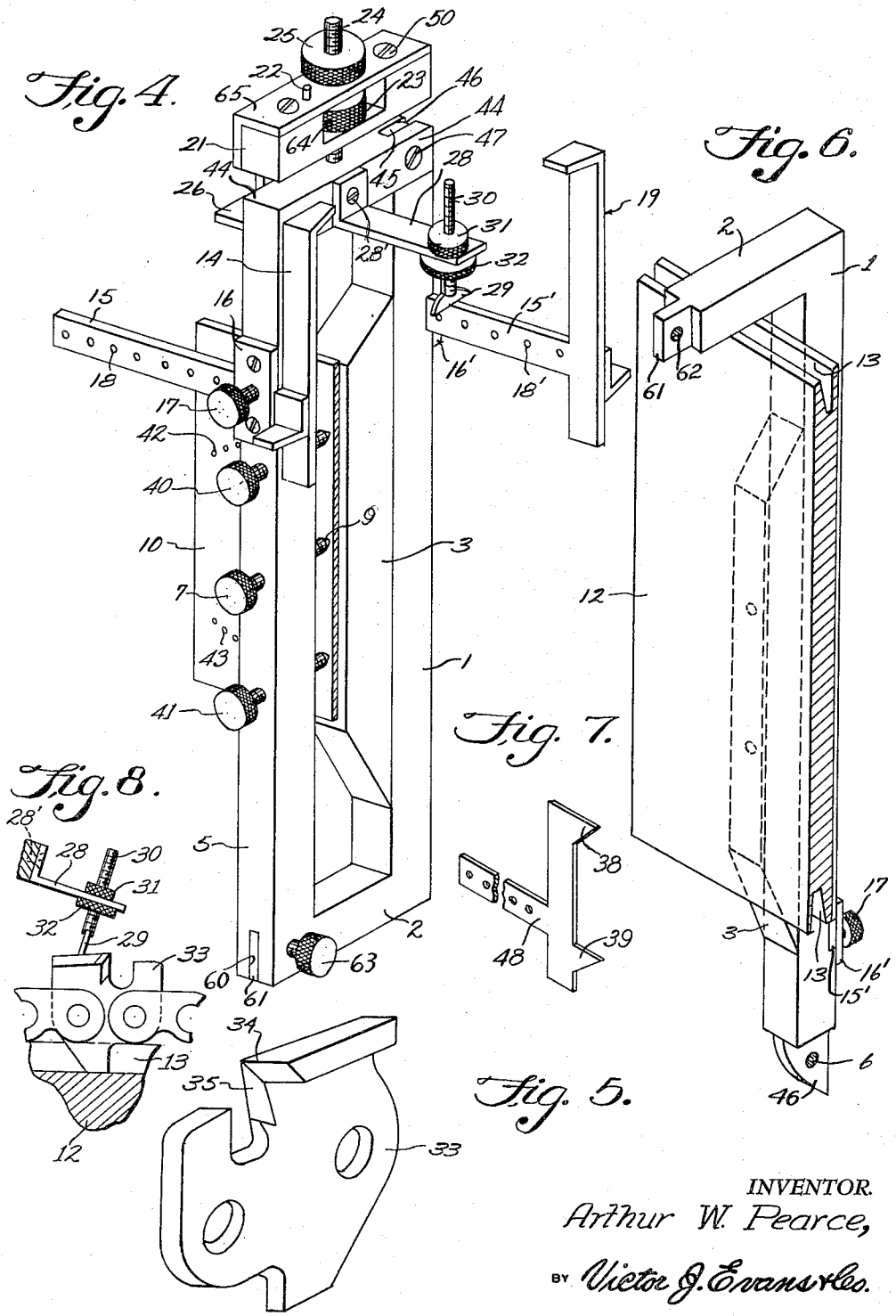
INVENTOR.
Arthur W. Pearce,
BY Victor J. Evans & Co.
ATTORNEYS

United States Patent Office 2,768,450
Patented Oct. 30, 1956

2,768,450

CHAIN GAUGE FOR A CHAIN SAW

Arthur W. Pearce, El Monte, Calif.

Continuation of application Serial No. 739,074, April 3, 1947. This application January 7, 1952, Serial No. 265,299

4 Claims. (Cl. 33—202)

This invention relates to chain saw sharpening gauges, and is a continuation of my abandoned application Serial No. 739,074, filed April 3, 1947.

It is an object of the present invention to provide a chain saw gauge for gauging and sharpening different types of cutting chains for a chain saw, to gauge and file the heights of the teeth of the cutting chains and all cutting surfaces, and angles of cutting surfaces which constitute a cutting chain sharpened to manufacturers specifications, all with the same instrument.

According to the invention, there is provided generally a body of a gauge or frame adapted to surround a guide plate of a chain saw and having a part which can be hinged away from the guide plate of a chain to permit the easy insertion of the device thereover and to permit the removal of the device from the guide plate of the chain saw. On the side of the guide plate of the chain saw there is disposed a pitch gauge or plate having holes arranged in the form of two arcs opposing one another and adapted to respectively receive the points of adjusting screws whereby to hold the body of the gauge with the gauging elements thereon in any one of several angular positions relative to the chain saw guide plate and to the teeth of the cutting chain extended thereover. The gauging elements with hardened filing surfaces themselves are adjustably connected to the body of the gauge or frame and can be extended therefrom to cooperate with the teeth of the cutting chain so they may be sharpened to the proper angles. The body of the gauge holds the gauging elements in rigid position on the chain saw guide plate and the chain saw cutting chain is manually moved on the guide plate so the teeth are brought into sharpening position with relation to the gauging elements and according to the type of tooth and type of cutting chain to be sharpened.

Thus the gauge of the present invention provides adjustable gauging and filing elements that permit filing of the cutting edges of the teeth, according to the type of cutting chain to be sharpened, after the height of the teeth has been determined and filed. Adjustable gauge elements are mounted on the top of the body of the gauge or frame to even the height of all the teeth according to the function of the tooth and also to adjust the body of the gauge on the guide plate so the gauging elements for the router or cap type tooth chains will be in position for gauging and sharpening this type tooth. The body of the gauge can be adjustably pivoted on the guide plate whereby the body of the gauge or frame may be moved circumferentially of the pivot point of the pitch gauge or plate to align the body of the gauge with the pitch grade markings as desired, for sharpening other than the router or cap tooth type cutting chains, and to hold the body of the gauge in position on the guide plate with relation to the rake of the teeth and to bring the gauging or filing elements into proper position for filing the teeth.

For better understanding of the invention, reference may be had to the following detailed description taken in connection with the accompanying drawing, in which—

Fig. 1 is a side elevational view of the gauge embodying the features of the present invention attached to the guide plate of a chain saw;

Fig. 2 is a front elevational view of the gauge which has been adjusted upon the pitch gauge placed against the guide plate of the chain saw;

Fig. 3 is a top plan view looking down upon the gauging elements;

Fig. 4 is a perspective view of a modified arrangement wherein router type tooth guides are attached to the body of the gauge with the gauge removed from the chain saw guide plate;

Fig. 5 is a perspective view of one form of chain saw tooth or router tooth, comprising one type of cutting chain, which is used on a chain saw; and which can be sharpened with the present gauge;

Fig. 6 is a view showing certain constructional details of the assembly;

Fig. 7 is a fragmentary and perspective view of a modified form of gauging or file guiding element; and Fig. 8 is a fragmentary view showing the router tooth gauging elements of Fig. 4 being used for aligning a router type tooth.

Referring now to the figures, 1 is an L-shaped body element having a leg 2 extending from one end of the body element at right angles thereto. The opposite end of the body element 1 is provided with a reduced projection 46 which is apertured at 6 for a purpose to be later described. The leg 2 at the outer end thereof is also provided with a reduced projection 61 which is apertured at 62 for a purpose to also be later described. A spacer 3 is attached to the inner surface of the body element 1 by screws 4 and provides a stablizing surface for the body element 1 when used upon the guide plate as a square to check the chain bearing surface of the guide plate. The body element 1 is disposed over the guide plate so that spacer 3 engages with the side of the guide plate and the leg 2 will extend under the guide plate. A second L-shaped body member 5 is provided at one end with an arm 44 which at its outer end is bifurcated as at 45 to receive the projection 46 of the body element 1. The bifurcated end 45 is apertured so that a screw 47 passing through the apretures of the end 45 and the aperture 6 of the projection 46 pivotally connects the arm 44 of the body element 5 to the projection 46 of the body element 1. Thus the element 5 can be brought downwardly against the opposite face of the guide plate. The opposite end of the body element 5 is bifurcated at 60 to receive the projection 61 of the leg 2 of the body element 1. The bifurcated end 60 is also apertured so that a screw 63 may pass through the apertures of the end 60 and aperture 62 of the projection 61 to assemble the body members 1 and 5 as shown in Fig. 1. In this position a pivot screw 7 with a pointed end 8 will enter a hole 9 of a pitch gauge or plate 10 which provides means for pivotally mounting the element 1 in relation to the pitch gauge or plate 10. The screw 7 holds the pitch gauge or plate 10 against the side of the guide plate and at the same time provides for the angular adjustment of the body of the gauge or frame about a central point to properly align the device for the filing or gauging of the various rakes of the cutting surfaces of chain saw teeth 11. With the device pivoted by the screw 7 the body of the gauge may be swung on the pivot until the desired degree of pitch or rake is selected, or until it is adjusted to the desired position and then it may be held by the thumb screws 40 and 41, the inner ends of which enter the arcuately disposed openings 42 and 43 in the pitch gauge or plate 10, the openings being positioned on radii extending from the center of the opening 9. The openings 42 and 43 on the pitch gauge 10 indicate various degrees from the vertical and progress on either side of the center of the pitch gauge 10. The openings 42 and 43 selectively receive the thumb screws 40 and 41 so that when the body of the gauge or frame has been pivoted on the pivot screws 7 the thumb screws 40 and 41 will enter the openings 42 and 43 to retain the body element 1 at the desired adjusted position in relation to the pitch gauge 10 with the top edge of the pitch gauge 10 evenly aligned with the top edge of the guide plate with only the body of the gauge and the gauging elements pivoted on pivot screw 7 to the various degrees. The tightening of all the screws will retain the assembly in fixed relation to the chain saw guide plate which is indicated at 12 and the teeth of the cutting chain 11 can be passed over grooves 13 in the upper and lower edges of the guide plate 12. The body of the gauge or frame being held rigid on the guide plate to the desired degree on the pitch gauge 10, which sets the gauging elements 14 and 19 to the desired pitch or rake of the teeth, in locked position on the guide plate 12.

Gauging is required to determine the proper height of the teeth and to provide an accurate measure for filing or otherwise adjusting the teeth which must be done before the cutting angles of the teeth are filed and to determine how much filing or adjusting has to be done to the teeth. Toward this end, there is mounted on the upper surface of the arm 44 of the body member 5 a vertically adjustable structure 21 which is retained against rotatonal displacement by guide pins 22 which are fixed in the arm 44. The structure 21 is provided with a recess 64 through which passes a screw 24 and the structure 21 is adjusted by turning a thumb wheel 23 disposed on the screw 24 within the recess 64. A stop or locking nut 25 is also disposed upon the screw 24 above the structure 21 and can be adjusted down upon the top plate 65 of the structure 21 which is retained in place by screws 50. Extending from the structure 21 is a gauging element 26 which is secured to the structure 21 by the screws 51 and the element 26 is provided with spaced depending lugs 52 at the lower end and by turning the micro nut 23 the lugs may be elevated or lowered in relation to the teeth of the chain saw cutting chain, with the teeth passing through the space between the depending lugs 52 and when adjusted to the desired position, the tightening nut 25 is turned to secure the depending lugs 52, which are hardened file guides, in the adjusted position.

In the modification shown in Fig. 4 an arm 28 is fixed to the arm 44 of the body member 5 by means of a screw 28' and to the outer end of the arm 28 there is attached a tooth locking element 29. This element 29 includes a screw 30 with lock nuts 31 and 32 which engage the opposite side of the arm 28 for retaining it in selected vertically adjusted position upon the arm 28 in order to accurately adjust the elevation of the element 29 in relation to the type of chain saw tooth. The arm 28 is bent slightly upward just beyond the point where it is attached to arm 44 of the body member 5 so that it may be used with the other elements on the arm to hold the different types of chain saw cutting chain teeth firmly in the groove of the guide plate while the tooth is being filed or adjusted. In sharpening the router or cap type tooth chain the body of the gauge is set in a vertical position on the pitch gauge plate 10 so the element 29 on the arm 28 bears just back of the top cutting edge of the router or cap type tooth. In sharpening the raker type tooth chain the body of the gauge is pivoted to the desired rake of the cutting edge of the tooth, which does not exceed 35 degrees, the bend in the arm 28 allows for the difference in the position of the body of the gauge on the guide plate allowing the element 29 to bear just back of the cutting edge holding the tooth in the groove of the guide plate. The vertical adjustment of the element 29 is accomplished by manually rotating the knurled knobs 31 and 32.

Gauging elements are required to determine the proper cutting angles of the teeth of the cutting chains and to provide stabilizing surfaces for a file for filing or otherwise adjusting the teeth in accordance with the gauging elements. Toward this end there is connected to the body member 5 for lateral adjustment, a gauging element 14 which is held upon an extension 15 which can be passed through a plate 16 and held in place by an adjusting screw 17. The screw 17 will enter any one of a plurality of holes 18 in the extension 15. On the body element 1 in opposed relation to the element 14 is a similar gauging element 19 which is similarly formed having an extension 15' which is passed through a plate 16' and is held in place by the screw 17' entering the holes 18' whereby the extension 15' is attached to the body element 1. Gauging elements 14 and 19 serve to determine the proper cutting angles of the teeth. These gauging elements can be extended outwardly from the main parts of the body of the gauge to the desired distance and retained in this position by means of the screws 17 and 17'.

By placing the upright lug of gauge element 14 against the body of the gauge as shown in Figure 4 and adjusting the upright lug of gauging and filing element 19 outward from the body of the gauge to the desired degree and tightening the adjusting screws 17 and 17' as shown in Fig. 4 the cutting angles of the teeth and forward pitch of the teeth may be filed at one setting of the gauge on one side of the cutting chain, and by placing the upright lug of gauging element 19 against the body of the gauge and the upright lug of gauging element 14 outward to the same desired degree then the cutting angle of the teeth and the forward pitch of the teeth on the other side of the body of the gauge may be filed. Each type of cutting chain for chain saws have right and left teeth for cutting the width of the cut to allow the chain and guide plate to pass through the cut.

All of these gauging elements can be applied to different portions of the saw teeth 11 to test the same for their proper cutting angles, height and other characteristics.

To sharpen a router type tooth on a router cutting chain the body of the gauge is placed in a vertical position on the guide plate and with the pivot screw 7 adjusted to a slip fit against the pitch plate 10 a thin file is placed under the depending lugs 52 and on top of the tooth, gauging element 26 is adjusted by thumb wheel 23 on the screw 24 until the gauging element 26 has assumed the position approximating Fig. 2, then the guiding projections 38 and 39 of edge of gauging element 48 which has replaced the gauging element 14 are adjusted to position so a small square file placed against the underside of projection 39 of the gauging element on one side of the body of the gauge with the upright lug of this element against the body of the gauge and the upright lug with corresponding projections as 38 and 39 on the other side of the body of the gauge extended outward to the desired degree and with the other end of the small square file placed against the underside of the upper projection 38, the juncture of the cutting edges of the router tooth 34 and 35 will align with the filing surfaces of the square file or the corner of the file will align the juncture of projection 38, the juncture of projection 39 and edge of the element 48 with juncture of edges 34 and 35. The body of the gauge is locked in this adjusted position by tightening thumb screws 40 and 41. The depending lugs 52 are adjusted with the router type tooth passing between them until a flat file placed on top of the depending lugs 52 just contacts the top of the router type tooth, the file is then reciprocated back and forth until the hardened surfaces of depending lugs 52 stops filing action on all teeth protruding between lugs 52. The teeth on the cutting chain are manually moved into position between the depending lugs 52 by moving the chain on the guide plate. This leaves a small flat spot on the top of the front cutting edges 34 and 35. The cutting edges 34 and 35 are sharpened by placing a small square file against the underside of projection 39 and the under side of the opposite lower projection 38 with the surface of the square file against the edges of both gauging elements 48 and the cutting edges 34 and 35 against the file until the side cutting edge 35 is filed back to the back edge of the flat spot that was filed on top of the tooth then the other flat surface of the file is rolled up against the underside of projections 38 and 39, the top cutting edge 35 is filed back until the edge junctures with edge 34, with the arm 28 and element 29 holding the tooth firmly against the edges of the guide plate. The depth guide for the router type tooth which is just ahead of the cutting edges 34 and 35 is filed by adjusting the height gauging elements so the depending lugs 52 stop filing action at the required depth.

Referring to Fig. 5, it will be apparent that the chain teeth 11 are one type of cutting chain and router type teeth 33 are another type of cutting chain. This router type tooth has cutting edges 34 and 35.

By using the gauging element 26, the user can determine whether the proper height has been given to the tooth. The gauging elements 14 and 19 serve to determine the proper cutting angle of the teeth. The adjusting nut 23 will effect a microsetting on the structure 21 and adjust the gauge on the guide plate to bring the projections of element 48 i. e. 38 and 39 into proper position with the router or cap type tooth so the cutting edges 34 and 35 will juncture properly and so the corner of the square file will juncture the cutting edges on both the right and left teeth.

Furthermore, the gauging elements 14, 19 and 26 serve as guides over which files can be extended which also includes the projections of element 48 i. e. 38 and 39, depending lugs 52 also serve as guides over which files can be extended. These elements are made of hard steel to resist filing and when the body of the gauge and the elements are in the proper position for filing the teeth, the gauging elements are actually used to guide the file.

In Fig. 7 there is shown a modified form of guiding element for filing a router or cap type tooth of a cutting chain. This element is of the same general shape as the other guiding elements except that the guiding projections extend longitudinally thereof as indicated at 38 and 39. These projections extend from one edge of the element, which is indicated by the number 48.

From the above description it will be apparent that the chain saw gauge of my invention contemplates gauge means for such necessary adjustments or corrections as may be required for the cutting chain of a chain saw and the device, simple in construction and operation and durable in use provides all the necessary gauge markings, indications and file guides for properly correcting all of the inaccurate alignments to which such cutting chains wear in normal use.

Having thus described the invention what I claim as new and desire to be protected by Letters Patent is:

1. A chain saw gauge comprising a frame that surrounds the guide plate of a chain saw, means for pivotally mounting the frame in relation to a saw, a T-shaped gauging element mounted on each side of said frame, said gauging elements being mounted in opposed relation to each other and projecting from the frame in the same direction for lateral adjustment independent of each other in relation to the frame to determine the correct pitch of the saw teeth and for sharpening the correct cutting angle of the saw.

2. A chain saw gauge as in claim 1, wherein said T-shaped gauging elements are of identical formation.

3. A chain saw gauge as in claim 1, wherein said frame is of rectangular formation.

4. A chain saw gauge comprising a rectangular shaped frame that surrounds the guide plate of a chain saw, means for pivotally mounting said frame in relation to the guide plate of a chain saw, two detachable T-shaped gauging elements adjustably mounted on the frame with relation to the teeth of the cutting chain on the guide plate to produce a unitary result in determining and filing the various pitches and various cutting angles of the teeth of various types of cutting chains for chain saws, said detachable T-shaped gauging elements projecting adjustably in the same direction on opposite sides of the frame, guide plate and chain teeth.

References Cited in the file of this patent
UNITED STATES PATENTS

| | | |
|---|---|---|
| 406,774 | Saunders | July 9, 1889 |
| 857,438 | Bryson | June 18, 1907 |
| 1,814,266 | Stauder | July 14, 1931 |
| 2,112,432 | Baumann | Mar. 29, 1938 |
| 2,422,871 | Wilson | June 24, 1947 |

FOREIGN PATENTS

| | | |
|---|---|---|
| 100,465 | Germany | Dec. 6, 1898 |
| 131,416 | Germany | Apr. 17, 1901 |